Jan. 20, 1959  F. J. KOEHL  2,869,394
BRAKE ACTUATING MECHANISM FOR MOTOR VEHICLE
Filed Nov. 19, 1956  2 Sheets-Sheet 1
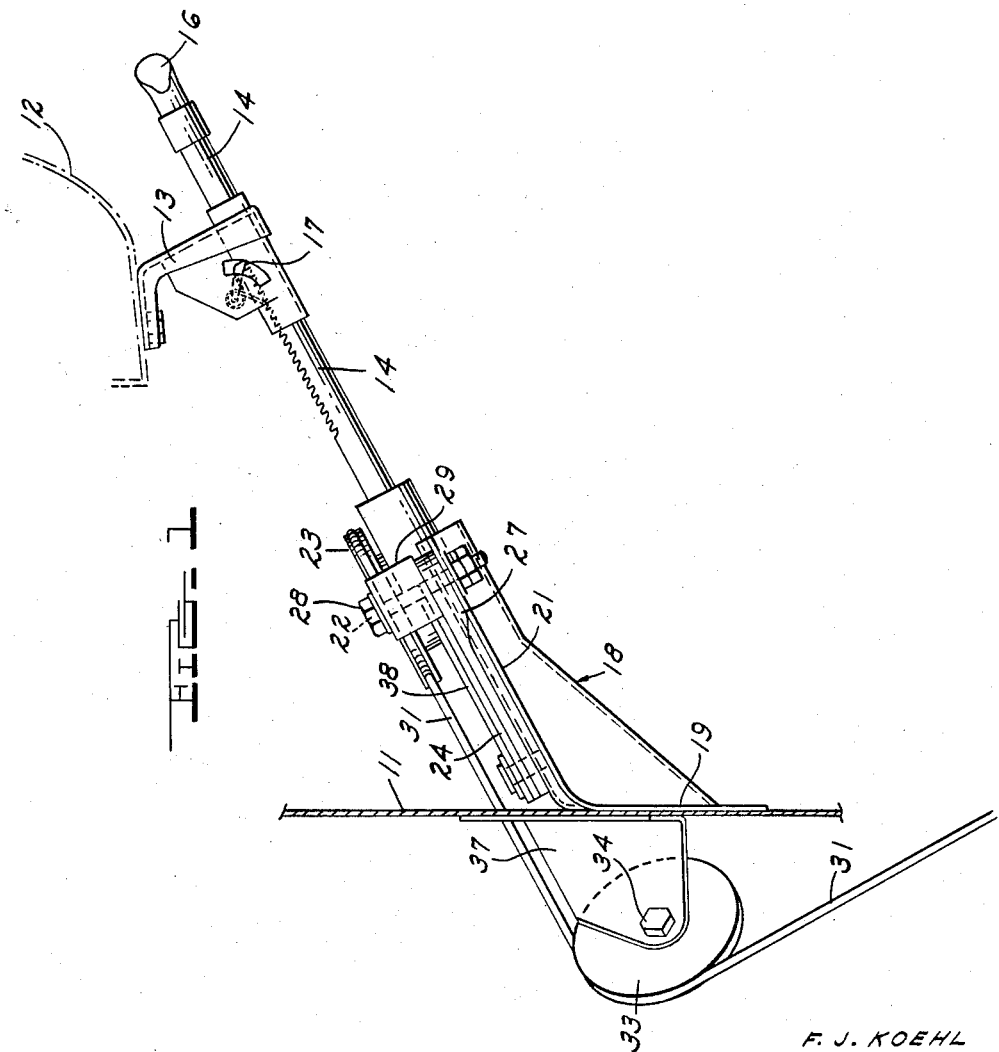
F. J. KOEHL
INVENTOR.
E. C. McRAE
BY  J. R. FAULKNER
T. H. OSTER
ATTORNEYS

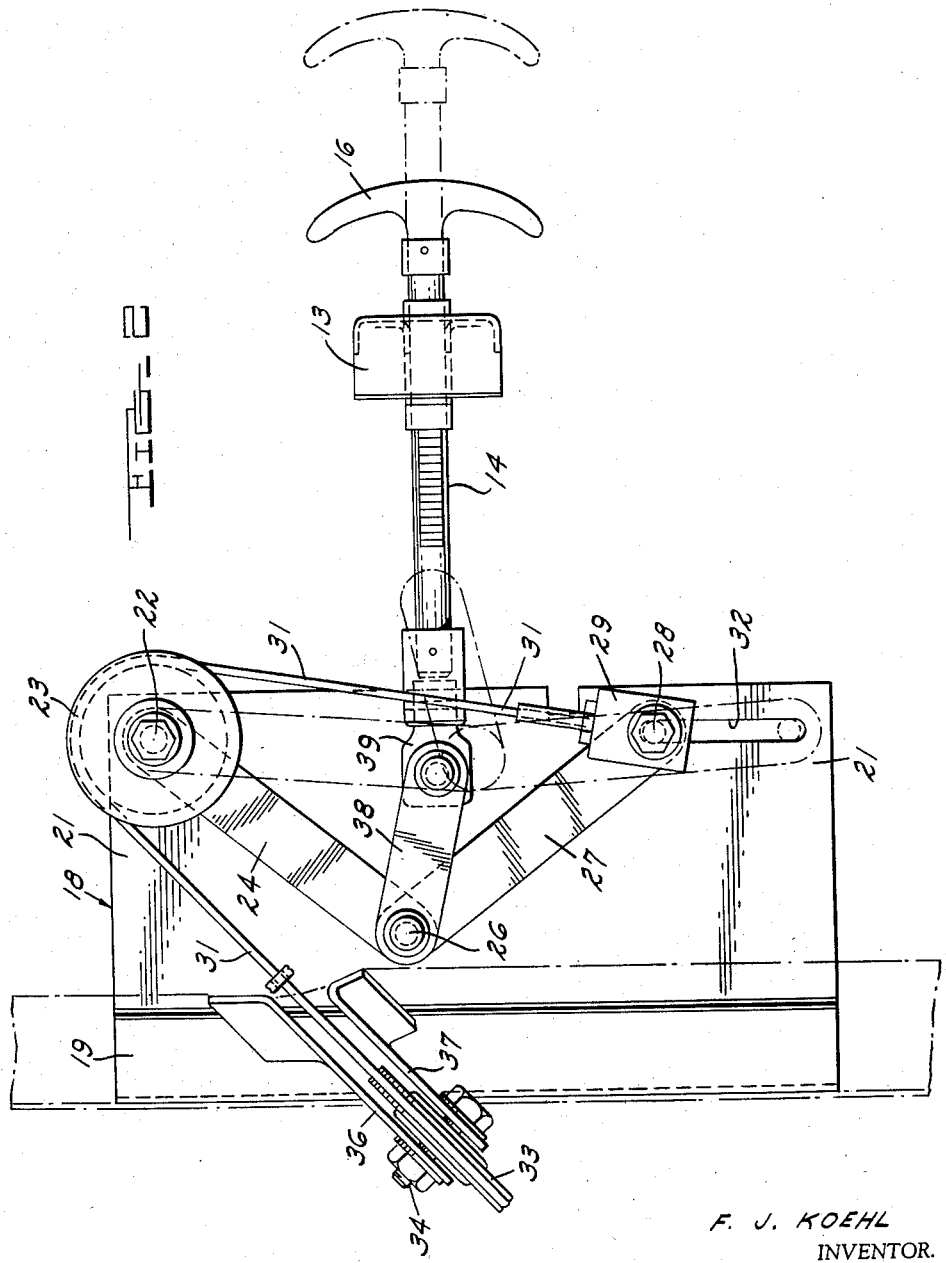

United States Patent Office 2,869,394
Patented Jan. 20, 1959

2,869,394

BRAKE ACTUATING MECHANISM FOR MOTOR VEHICLE

Frank J. Koehl, Pontiac, Mich., assignor to Ford Motor Company, Dearborn, Mich., a corporation of Delaware Application November 19, 1956, Serial No. 622,971

3 Claims. (Cl. 74—520)

This application relates to brake actuating mechanisms for motor vehicles.

The parking brakes of motor vehicles are conventionally actuated by means of a manual handle mounted on the dash or instrument panel of the vehicle and operatively connected by means of a cable or suitable linkage to the vehicle wheel brakes. Due to the crowded conditions in this area of the vehicle it is often difficult to locate the brake actuating mechanism in a conveniently operated location and at the same time provide the proper mechanical advantage to properly apply the brakes, while at the same time routing the linkage or cable to the wheel brakes without interfering with other vehicle components.

In the present invention these and other difficulties are met by mounting a supporting bracket upon the vehicle dash panel generally in alignment with a reciprocably mounted pull handle, and by mounting upon the supporting plate toggle linkage in combination with an actuating cable connected to the linkage and guided by the structure in such manner as to provide a compact efficient assembly enabling the requisite mechanical advantage to be obtained to properly apply the brakes while at the same time routing the cable in such manner as to occupy a minimum of space and avoid interference with other vehicle components.

A further object of the invention is to provide brake actuating mechanism having a minimum of friction and being relatively simple in construction so as to effect manufacturing economies as well as provide maintenance free operation.

Other objects and advantages of this invention will be made more apparent as this description proceeds, particularly when considered in connection with the accompanying drawings, wherein:

Figure 1 is a side elevational view of brake actuating mechanism incorporating the present invention.

Figure 2 is a plan view of the structure shown in Figure 1.

Referring now to the drawings, the reference character 11 indicates the dash panel of a motor vehicle forming a vertical wall between the engine and passenger compartments of the vehicle. A transversely extending instrument panel 12 supports a bracket 13 depending therefrom which in turn supports and guides a reciprocable brake actuating rod 14 having a manually operable pull handle 16 at its upper end. Suitable ratchet mechanism 17, conventional in construction, is provided between the bracket 13 and the actuating rod 14 to enable the rod to be held in applied position, yet readily released by turning the handle 16 through a 90° angle.

A generally L-shaped supporting bracket 18 is mounted upon the dash panel 11 of the vehicle, with its vertical flange 19 secured to the dash panel. The supporting bracket 18 also has an upper flange 21 extending generally parallel to the actuating rod 14.

A pivot stud 22 is mounted upon the flange 21 of the supporting bracket 18 adjacent one edge thereof, and pivotally supports a grooved pulley 23 and one end of a toggle link 24 for independent rotation about the common axis formed by the pivot stud. The opposite end of the toggle link 24 is pivotally connected by means of a pivot pin 26 to one end of a second toggle link 27. The opposite end of the second toggle link 27 is pivotally connected by means of a pivot stud 28 to the flange 21 of the supporting bracket 18 and also to a block 29 forming an anchorage for one end of a flexible cable 31. The pivot stud 28 is slidably mounted in a slot 32 formed in the flange 21 of the supporting bracket.

The flexible cable 31 is reeved around the grooved pulley 23 mounted upon the pivot stud 22 and is then directed to a second grooved pulley 33 mounted upon a pivot stud 34 extending between a pair of mounting brackets 36 and 37 secured to the dash panel 11. The free end of the cable 31 may thus be directed in any chosen direction for attachment to the vehicle wheel brakes in conventional manner.

The pivotal connection 26 between the toggle links 24 and 27 is connected by means of a link 38 to a yoke 39 secured to the end of the actuating rod 14.

In operation, it will be seen that when the manual handle 16 is pulled outwardly, the toggle linkage comprising the pivotally interconnected links 24 and 27 is straightened, accompanied by movement of the pivot stud 28 laterally outwardly in the slot 32 away from the fixed pivot 22 at the opposite end of the toggle linkage. The flexible cable 31 is thus pulled around the pulley 23 with considerable mechanical advantage. Thus, a moderate effort applied to the manual handle 16 applies the vehicle wheel brakes with a substantially increased force to effectively apply the brakes. During this brake application it will be seen that the pivotal connection 26 between the toggle links swing in an arc about the pivot axis 22, and that this arc lies substantially in alignment with the control rod 14 actuated by the pull handle 16. The link 38 permits the necessary arcuate movement.

Suitable spring means (not shown) are connected to the brake mechanism between the assembly shown and the wheel brakes, or are embodied in the wheel brakes, to return the toggle linkage to the inoperative position shown in the drawings when the manually operable handle 16 is released from the ratchet holding means 17.

It will be seen that the assembly is compact and conveniently located in a protected area under the vehicle instrument panel, yet may be readily connected to the vehicle wheel brakes by the flexible cable 31.

The invention contemplates the actuation of the flexible cable through the toggle linkage by manually operable means other than a pull handle, and other modifications within the spirit and scope of the invention are likewise intended to be covered.

It will be understood that the invention is not to be limited to the exact construction shown and described, but that various changes and modificaions may be made without departing from the spirit and scope of the invention, as defined in the appended claims.

What is claimed is:

1. Mechanism for actuating the brakes of a motor vehicle, comprising a supporting bracket rigidly mounted upon said vehicle, toggle linkage including a pair of pivotally interconnected toggle links mounted upon said supporting bracket, means pivotally connecting one of said links to said bracket on a fixed axis, means slidably connecting the other of said links to said bracket for sliding movement toward and away from said fixed axis along a predetermined path, the fixed axis formed by the pivotal connection between said one toggle link and said bracket substantially intersecting the axis of the predetermined path of movement of the opposite end of the other of said toggle links, a grooved pulley pivotally mounted on said fixed axis, a flexible cable reeved over said pulley and operatively connected to said vehicle brakes, the opposite end of said cable being connected to said other link for movement toward and away from said pulley as said other link moves along said predetermined path, and manually operable means connected to said toggle linkage and movable in a path generally at right angles to said predetermined path to apply and release said brakes through said toggle linkage and interconnected cable.

2. Mechanism for actuating the brakes of a motor vehicle, comprising a supporting bracket rigidly mounted upon said vehicle, toggle linkage including a pair of pivotally interconnected toggle links mounted upon said supporting bracket, means pivotally connecting one of said links to said bracket on a fixed axis, said supporting bracket having an elongated slot therein with its axis substantially intersecting said fixed axis, a pivot member extending through said slot for slidable movement therein and connected to the other of said links to restrain the movement of said other link along the predetermined path defined by said slot, a grooved pulley pivotally mounted upon said fixed axis, a flexible cable reeved over said pulley and operatively connected to said vehicle brakes, the opposite end of said cable being connected to said other link adjacent the connection of said link to said pivot member for movement toward and away from said pulley as said pivot member moves along said slot, and manually operable means connected to said toggle linkage and movable in a path generally at right angles to the axis of said slot to apply and release said brakes through said toggle linkage and interconnected cable.

3. Mechanism for actuating the brakes of a motor vehicle, comprising a supporting bracket rigidly mounted upon said vehicle, toggle linkage including a pair of pivotally interconnected toggle links mounted upon said supporting bracket, means pivotally connecting one end of one of said links to said bracket on a fixed axis, said bracket having an elongated slot formed therein spaced from said fixed axis, means pivotally and slidably connecting one end of the other of said links for movement along said elongated slot, a grooved pulley pivotally mounted upon said supporting bracket, a flexible cable reeved over said pulley and operatively connected to said vehicle brakes, the opposite end of said cable being connected to said other link for movement toward and away from said pulley as said other link moves along said elongated slot, means pivotally interconnecting the opposite ends of said two toggle links, and manually operable means connected to said last mentioned interconnection and movable in a path generally at right angles to the axis of said elongated slot to apply and release said brakes through said toggle links and interconnecting cable.

References Cited in the file of this patent

UNITED STATES PATENTS

| | | |
|---|---|---|
| 1,094,366 | Haller | Dec. 8, 1954 |
| 2,751,793 | Sandberg | June 26, 1956 |

FOREIGN PATENTS

| | | |
|---|---|---|
| 411,977 | Great Britain | June 21, 1934 |